United States Patent
Bloy et al.

(10) Patent No.: US 11,144,960 B2
(45) Date of Patent: Oct. 12, 2021

(54) SYSTEMS AND METHODS FOR DYNAMIC CONTEXT-BASED ELECTRONIC OFFER COMMUNICATION

(71) Applicant: The Toronto-Dominion Bank, Toronto (CA)

(72) Inventors: Adrian Bloy, Ottawa (CA); Sebastien Forget, Limoges (CA); Ryan Edmund Vekeman, Ottawa (CA); Connie Maun-Fong Chan, Ottawa (CA); Daniel Lam Tin Cheung, Richmond Hill (CA); Arun Victor Jagga, Toronto (CA); John Jong-Suk Lee, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 362 days.

(21) Appl. No.: 15/654,123

(22) Filed: Jul. 19, 2017

(65) Prior Publication Data
US 2019/0026777 A1    Jan. 24, 2019

(51) Int. Cl.
*G06Q 30/00*  (2012.01)
*G06Q 30/02*  (2012.01)
(Continued)

(52) U.S. Cl.
CPC ....... *G06Q 30/0261* (2013.01); *G06F 16/487* (2019.01); *H04W 88/06* (2013.01)

(58) Field of Classification Search
None
See application file for complete search history.

(56) References Cited

U.S. PATENT DOCUMENTS 8,281,037 B2 * 10/2012 Julia .............. G06Q 30/02
709/249
8,559,968 B2 * 10/2013 Frank ............ G06Q 30/02
455/404.2

(Continued)

FOREIGN PATENT DOCUMENTS

WO   WQ-2009005865 A2 *  1/2009  ........... H04W 4/029
WO   WO 2013113025 A2    8/2013

OTHER PUBLICATIONS

VisaSecurity Tokenization Infographic, Jan. 3, 2017, Visa, Inc., printed through www.archive.org (Date is in the URL in YYYYMMDD format) (Year: 2017).*

(Continued)

*Primary Examiner* — Naresh Vig
(74) *Attorney, Agent, or Firm* — Rowand LLP

(57) ABSTRACT

The disclosed embodiments generally relate to systems, methods, and apparatus for dynamic context-based electronic offer communication. In one aspect, a computer server is disclosed, comprising: a hardware processor configured to execute instructions stored in a memory to: receive location data from a mobile device; determine a context of the mobile device based on the location data; generate a database query using the determined context; send the generated query to an events database; receive a conditional electronic offer from the events database; determine user data requirements based on the conditional electronic offer; send a request based on the user data requirements to a secure server; receive user data from the secure server; generate an electronic offer communication based on the conditional electronic offer when the user data received from the secure server meets the user data requirements; and send the electronic offer communication to the mobile device.

18 Claims, 8 Drawing Sheets

(51) Int. Cl.
*H04W 88/06* (2009.01)
*G06F 16/487* (2019.01)

(56) References Cited

U.S. PATENT DOCUMENTS

| | | | | |
|---|---|---|---|---|
| 10,163,110 B2* | 12/2018 | Griffith | | G06Q 30/00 |
| 10,296,945 B2* | 5/2019 | Kusens | | G06Q 10/0833 |
| 10,776,826 B2* | 9/2020 | Kramer | | G06Q 30/0261 |
| 2006/0178932 A1* | 8/2006 | Lang | | G06Q 30/0277 |
| | | | | 705/14.73 |
| 2008/0109317 A1* | 5/2008 | Singh | | G06Q 30/0254 |
| | | | | 705/14.5 |
| 2008/0147487 A1* | 6/2008 | Hirshberg | | G06Q 30/02 |
| | | | | 705/14.53 |
| 2010/0217660 A1* | 8/2010 | Biswas | | G06Q 30/02 |
| | | | | 705/14.38 |
| 2011/0066479 A1* | 3/2011 | Benson | | G06Q 20/12 |
| | | | | 705/14.4 |
| 2011/0238476 A1* | 9/2011 | Carr | | G06Q 30/00 |
| | | | | 705/14.25 |
| 2012/0215681 A1 | 8/2012 | Jenkins et al. | | |
| 2013/0046635 A1 | 2/2013 | Grigg et al. | | |
| 2015/0324860 A1* | 11/2015 | Allen | | G06Q 30/08 |
| | | | | 705/14.66 |
| 2016/0078427 A1 | 3/2016 | Lyman et al. | | |
| 2017/0039594 A1* | 2/2017 | Shaw | | G06Q 30/0261 |

OTHER PUBLICATIONS

Stephen Lawson, Ten Ways Your Smartphone Knows Where You Are, Apr. 6, 2012, www.pcworld.com (Year: 2012).*
Harari et al., Using Smartphones to Collect Behavioral Data in Psychological Science, Nov. 2016, Prospect Psychology Science. (Year: 2016).*

* cited by examiner

SYSTEMS AND METHODS FOR DYNAMIC CONTEXT-BASED ELECTRONIC OFFER COMMUNICATION

TECHNICAL FIELD

The disclosed embodiments generally relate to systems, methods, and apparatus for dynamic context-based electronic offer communication, and for example, and without limitation, to systems and methods for providing dynamically changing, context-based event-triggered product and/or service offerings based on monitored sensor data obtained from network devices.

BACKGROUND

Marketing campaigns are a common occurrence, especially for merchant credit cards. One method of providing credit card offers to potential customers is to target them in the vicinity of either an event (such as at a sporting event, concert, or in-store sales event). Traditional targeting processes usually require the labor of a marketing representative manually offering information regarding the card to the potential customer, or a cashier providing a one-time offer for the card at checkout, both requiring the time and effort of a person who is physically present.

SUMMARY

Given the advent of both mobile phones, targeted marketing, and digital wallets, technological solutions may be provided to circumvent the manual intervention otherwise required for traditional targeting processes. In one aspect, a system is disclosed that can provide customized offers to customers based on contextual information regarding the customer. Thus, the system is able to provide different products and/or services having different application elements required for approval based on the customers context.

One improvement is providing the customer a customized offer based on their location. For example, upon being detected at an airport the customer may be targeted with a card having low currency conversion rates. However, beyond just the locational information, there may be two cards with lower currency conversion that can be offered to the customer one having a higher limit than the other, but differing in the amount of information required for approval of the user's application. For example, in some situations, a lower-limit card (e.g., having a limit of $500 in credit charges per month) may require only a credit check while a higher limit card may require a credit check as well as proof of employment. In order to determine which card to offer the customer, the system may analyze either the person's online information or further look at their banking information. If the person happens to be a customer of the merchant's bank, the system may also populate the users credentials in the application automatically.

There is disclosed, in one aspect, a computer server, comprising: a memory storing instructions; a communications interface; and a hardware processor coupled to the memory and the communications interface, the hardware processor configured to execute the instructions to cause the hardware processor to: receive via the communications interface location data from a mobile device; determine a context of the mobile device based on the location data; generate a database query using the determined context; send via the communications interface the generated query to an events database; receive via the communications interface a conditional electronic offer from the events database; determine user data requirements based on the conditional electronic offer; send via the communications interface a request based on the user data requirements to a secure server; receive via the communications interface user data from the secure server; generate an electronic offer communication based on the conditional electronic offer when the user data received from the secure server meets the user data requirements; and send via the communications interface the electronic offer communication to the mobile device.

The location data may include global positioning system data, or data related to: a Wi-Fi network connection, a cellular communications connection, a near-field communication signal, and a Bluetooth connection.

The hardware processor may be further configured to execute the instructions to cause the hardware processor to: aggregate location data from a plurality of mobile devices; and analyze the aggregated location data to determine the context.

The hardware processor may be further configured to execute the instructions to cause the hardware processor to: determine that the user data requirements include a requirement for secured user data; send via the communications interface a request for an identification token to the user mobile device, and receive via the communications interface the identification token from the mobile device; generate a request for the secured user data using the user data requirements and the identification token; and send via the communications interface the request for the secured user data to the secure server, and receive via the communications interface the secured user data from the secure server.

The hardware processor may be further configured to execute the instructions to cause the hardware processor to: obtain via the communications interface device or application settings data associated with the mobile device; and format the electronic offer communication based on the device or application settings data associated with the mobile device.

The events database may reside at a merchant server, and the secure server may be a bank server.

There is disclosed, in another aspect, a computer-implemented method, comprising: receiving, by at least one hardware processor, via a communications interface location data from a mobile device; determining, by the at least one hardware processor, a context of the mobile device based on the location data; generating, by the at least one hardware processor, a database query using the determined context; sending, by the at least one hardware processor, via the communications interface the generated query to an events database; receiving, by the at least one hardware processor, via the communications interface a conditional electronic offer from the events database; determining, by the at least one hardware processor, user data requirements based on the conditional electronic offer; sending, by the at least one hardware processor, via the communications interface a request based on the user data requirements to a secure server; receiving, by the at least one hardware processor, via the communications interface user data from the secure server; generating, by the at least one hardware processor, an electronic offer communication based on the conditional electronic offer when the user data received from the secure server meets the user data requirements; and sending, by the at least one hardware processor, via the communications interface the electronic offer communication to the mobile device.

The location data may include global positioning system data, or data related to: a Wi-Fi network connection, a cellular communications connection, a near-field communication signal, and a Bluetooth connection.

The method may further comprise: aggregating, by the at least one hardware processor, location data from a plurality of mobile devices; and analyzing, by the at least one hardware processor, the aggregated location data to determine the context.

The method may further comprise: determining, by the at least one hardware processor, that the user data requirements include a requirement for secured user data; sending, by the at least one hardware processor, via the communications interface a request for an identification token to the user mobile device, and receiving, by the at least one hardware processor, via the communications interface the identification token from the mobile device; generating, by the at least one hardware processor, a request for the secured user data using the user data requirements and the identification token; and sending, by the at least one hardware processor, via the communications interface the request for the secured user data to the secure server, and receiving, by the at least one hardware processor, via the communications interface the secured user data from the secure server.

The method may further comprise: obtaining, by the at least one hardware processor, via the communications interface device or application settings data associated with the mobile device; and formatting, by the at least one hardware processor, the electronic offer communication based on the device or application settings data associated with the mobile device.

The events database may reside at a merchant server, and the secure server may be a bank server.

There is disclosed, in another aspect, a non-transitory computer-readable medium, which when executed by a hardware processor, cause the hardware processor to: receive via the communications interface location data from a mobile device; determine a context of the mobile device based on the location data; generate a database query using the determined context; send via the communications interface the generated query to an events database; receive via the communications interface a conditional electronic offer from the events database; determine user data requirements based on the conditional electronic offer; send via the communications interface a request based on the user data requirements to a secure server; receive via the communications interface user data from the secure server; generate an electronic offer communication based on the conditional electronic offer when the user data received from the secure server meets the user data requirements; and send via the communications interface the electronic offer communication to the mobile device.

The location data may include global positioning system data, or data related to: a Wi-Fi network connection, a cellular communications connection, a near-field communication signal, and a Bluetooth connection.

The medium may further store instructions, which when executed by the hardware processor, cause the hardware processor to: aggregate location data from a plurality of mobile devices; and analyze the aggregated location data to determine the context.

The medium may further store instructions, which when executed by the hardware processor, cause the hardware processor to: determine that the user data requirements include a requirement for secured user data; send via the communications interface a request for an identification token to the user mobile device, and receive via the communications interface the identification token from the mobile device; generate a request for the secured user data using the user data requirements and the identification token; and send via the communications interface the request for the secured user data to the secure server, and receive via the communications interface the secured user data from the secure server.

The medium may further store instructions, which when executed by the hardware processor, cause the hardware processor to: obtain via the communications interface device or application settings data associated with the mobile device; and format the electronic offer communication based on the device or application settings data associated with the mobile device.

The events database may reside at a merchant server, and the secure server may be a bank server.

Additional objects and advantages of the disclosed embodiments will be set forth in part in the description that follows, and in part will be obvious from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments as claimed.

BRIEF DESCRIPTION OF THE DRAWINGS

The accompanying drawings constitute a part of this specification. The drawings illustrate several embodiments of the present disclosure and, together with the description, serve to explain the principles of the disclosed embodiments as set forth in the accompanying claims.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
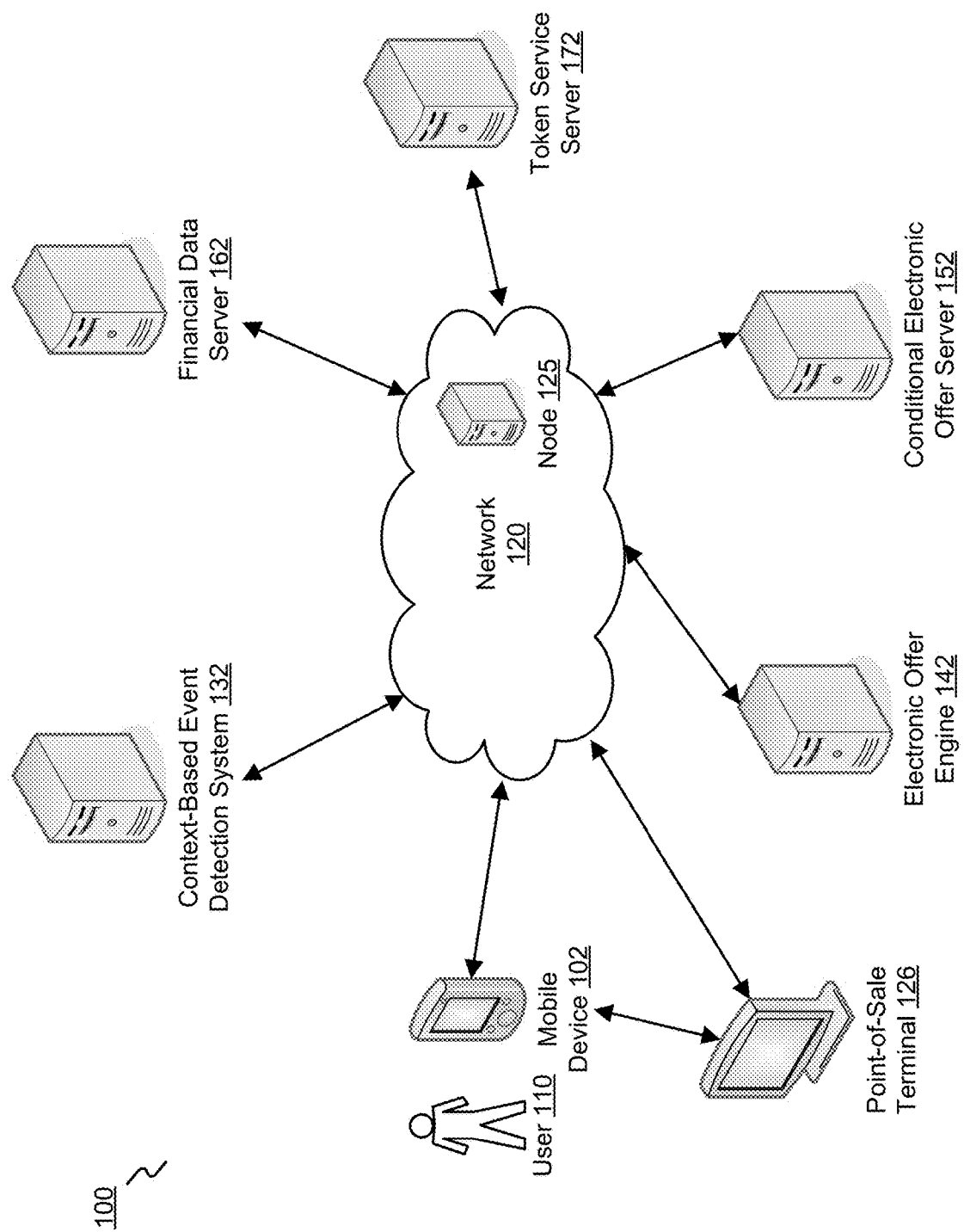
FIG. 1 depicts an exemplary computing environment consistent with disclosed embodiments.

FIG. 1 depicts an exemplary computing environment consistent with disclosed embodiments, and FIGS. 2A-2F depict additional aspects of an exemplary computing environment consistent with disclosed embodiments.

Figure 2A:
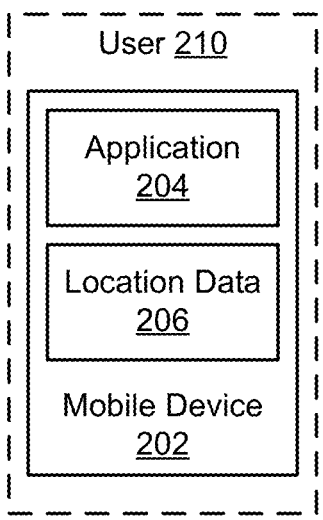
FIGS. 2A-2F depict additional aspects of an exemplary computing environment consistent with disclosed embodiments.

Referring to FIGS. 1 and 2A, in some aspects, environment 100 may include one or more mobile devices (e.g., mobile devices 102, 202), which may be associated with respective one or more users (e.g., users 110, 210). In certain embodiments, a mobile device may include any computing, data transmitting, data receiving, or data processing device consistent with the disclosed embodiments. In certain aspects, a mobile device may include any device capable of providing and receiving information over a communications network (e.g., communications network 120). For example, a mobile device may include a personal computer, a laptop computer, a tablet computer, a notebook computer, a handheld computer, a personal digital assistant, a portable navigation device, a mobile phone, a wearable device (e.g., a smart watch), an embedded device, a smartphone, an RFID device, a pager, and any additional or alternate device capable of receiving or providing information to communications network 120 (e.g., a computer system 300 of FIG. 3).

Additionally or alternatively, mobile devices consistent with the disclosed embodiments may include a location device or sensor (e.g., global positioning system (GPS) unit, an RFID unit, etc.) capable of obtaining location data indicative of a current geographic position of the corresponding client and/or scenario data collection device. In certain aspects, the mobile devices may process the received location data and transmit portions of the received location data to a context-based event detection system 132. This transmitted data may be transmitted in association with additional contextual data collected by such devices, for example, at regular or predetermined intervals, in response to requests received from system 132 or otherwise, for example, when contextual data collected exceeds a certain threshold in size (e.g., megabytes), or is of a specific type (e.g., indicating that the user is at a point-of-sale terminal 126), or meets other requirements, as determined by the device.

In some aspects, mobile device 102 may interact with point-of-sale terminal 126. Point-of-sale terminal 126 may be any terminal on which a user 110 may perform a transaction. Examples of point-of-sale terminals include card readers (e.g., based on barcode readers, chip readers, NFC sensors, Bluetooth sensors, etc.), ATM machines, ticket readers (e.g., at sporting stadiums), key fob sensors, or other security/access control systems, etc.

As described below, context-based event detection system 132 may process the received location data to monitor current geographic positions of the mobile devices to gather contextual data with which to determine the context associated with the mobile devices. Other contextual data may be collected by mobile devices and transmitted to context-based event detection system 132. The contextual data may include application or device settings data, and/or user data such as a users contact data, calendar data, messaging or other communication related data, time, date, location, etc.

Figure 2B:
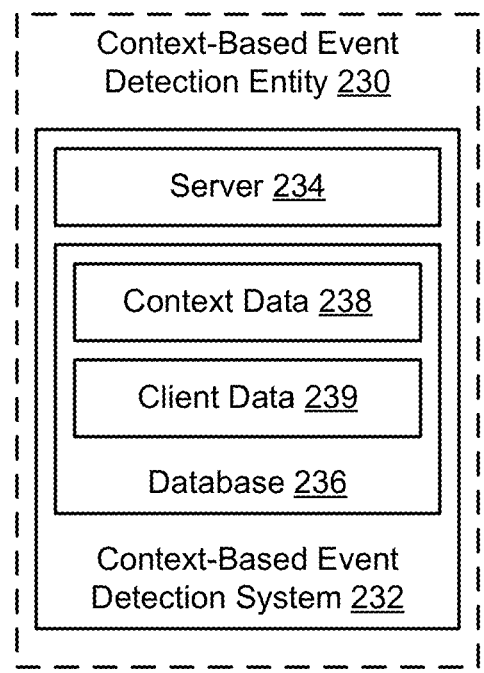

Referring to FIGS. 1 and 2B, in further aspects, computing environment 100 may include one or more context-based event detection systems (e.g., systems 132, 232), which may be associated with one or more context-based event detection entities (e.g., entity 230). In certain aspects, context-based event detection system 232 may be configured to process, store, receive, obtain, and transmit information. In certain aspects, such systems may be configured to execute software instructions to perform one or more processes consistent with the disclosed embodiments. In some embodiments, context-based event detection entity 230 may include any entity storing, using, managing, or processing information related to providing context-based detection for a user or other entity. For example, in some aspects, a context-based event detection entity may include a business entity providing such detection as a service.

In certain aspects, context-based event detection system 232 may include one or more servers (e.g., server 234), and one or more data repositories (e.g., database 236). In some embodiments, server 234 may include software programs and one or more processors for executing the programs. Server 234 may be configured to execute software instructions to perform one or more processes consistent with the disclosed embodiments. In one embodiment, for example, a user device (e.g., mobile devices 102, 202) and/or another computing system may exchange information facilitating execution of the one or more processes consistent with the disclosed embodiments. The software instructions of server 234 may be incorporated into a single computer, a single server, or any additional or alternative computing device apparent to one of ordinary skill in the art. Server 234 may also include distributed computing devices and computing systems, and may execute software instructions on separate computing systems and servers. Context-based event detection system 232 may include one or more data repositories (e.g., database 236) configured to store information consistent with the disclosed embodiments (e.g., information related to, obtained from, and/or sent to mobiles devices or other servers in the environment 100, user preferences received over communications network 120, etc.). The information may comprise contextual data 238 and client data 239, for example. Client data 239 may comprise information identifying a particular user and/or associated client devices of the particular user from which contextual data 238 is received. Contextual data 238 may comprise the device, application, and/or settings data, as well as user data such as a users contact data, calendar data, messaging or other communication related data, time, date, location, etc. received and/or processed by system 232 associated with the user.

In some aspects, context-based event detection system 132 may include a computer having one or more processors selectively activated or reconfigured by a software program. Such a computer may be configured as a particular computing system based on execution of software instructions that perform one or more processes consistent with the disclosed embodiments. In certain aspects, context-based event detection system 132 may be incorporated as corresponding nodes in a distributed network, and/or as corresponding networked servers in a cloud-computing environment. In one embodiment, context-based event detection system 132 may communicate with one or more additional servers that facilitate the distribution of processes for parallel execution by the additional servers.

Figure 2C:
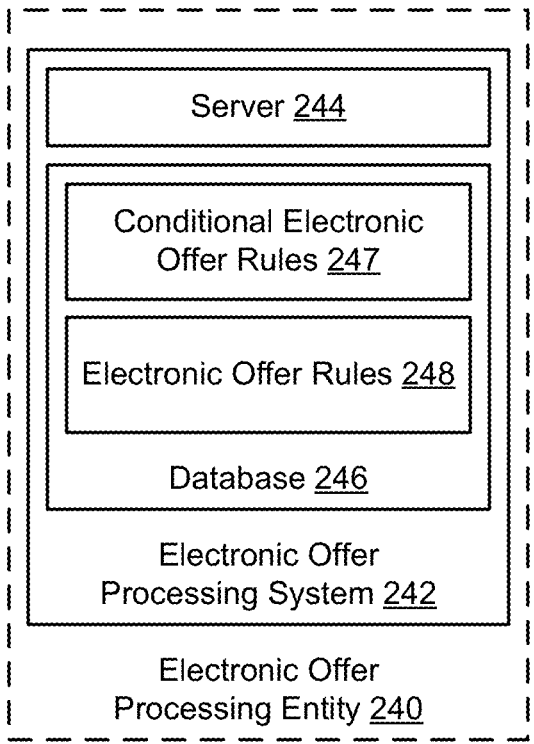

Referring to FIGS. 1 and 2C, in further aspects, computing environment 100 may include one or more electronic offer engines or electronic offer processing systems (e.g., electronic offer engine 142 or electronic offer processing system 242), which may be associated with one or more electronic offer processing entities (e.g., entity 240).

In certain aspects, electronic offer processing system 242 of environment 100 may be configured to process, store, receive, obtain, and transmit information over communications network 120 for use in processes consistent with the disclosed embodiments. In certain aspects, such systems may be configured to execute software instructions to perform one or more processes consistent with the disclosed embodiments. In some aspects, electronic offer processing system 242 may be associated with one or more electronic offer processing entities (e.g., entity 240). In some embodiments, electronic offer processing entity 240 may include any entity storing, using, managing, or processing information related to providing dynamic, context-based electronic offer communications for a user or other entity (e.g., any of the entities described in connection with electronic offer processing entity 240, context-based event detection entity 230, conditional electronic offering entity 250, financial data entity 260, token service provider entity 270, a separate business entity, a human user, etc.). For example, in some aspects, an electronic offer processing entity 240 may include a business entity providing such determination as a service. In some embodiments, electronic offer processing entity 240 may be related to, concomitant with, or associated with context-based event detection entity 230, conditional electronic offering entity 250, financial data entity 260, or token service provider entity 270, although such relationship is not required.

In some aspects, electronic offer processing system 242 may include a computer having one or more processors selectively activated or reconfigured by a software program. Such a computer may be configured as a particular computing system based on execution of software instructions that perform one or more processes consistent with the disclosed embodiments. In certain aspects, electronic offer processing system 242 may be incorporated as corresponding nodes in a distributed network, and/or as corresponding networked servers in a cloud-computing environment. In one embodiment, electronic offer processing system 242 may communicate with one or more additional servers that facilitate the distribution of processes for parallel execution by the additional servers.

As noted, in certain aspects, electronic offer processing system 242 may include one or more servers (e.g., server 244), and one or more data repositories (e.g., database 246). In some embodiments, server 244 may include software programs and one or more processors for executing the programs. Server 244 may be configured to execute software instructions to perform one or more processes consistent with the disclosed embodiments. In one embodiment, for example, an electronic offer processing system (e.g., system 242) and/or another computing system may exchange information facilitating execution of the one or more processes consistent with the disclosed embodiments. The software instructions of server 244 may be incorporated into a single computer, a single server, or any additional or alternative computing device apparent to one of ordinary skill in the art. Server 244 may also include distributed computing devices and computing systems, and may execute software instructions on separate computing systems and servers. The one or more data repositories (e.g., database 246) may be configured to store rules to govern processing, such as conditional electronic offer rules 247 and/or electronic offer rules 248, as well as information consistent with the disclosed embodiments (e.g., information related to, obtained from, and/or sent to user device (e.g., mobile device 202), context-based event detection system 232, conditional electronic offer system 252, financial data system 262, user preferences received over communications network 120, etc.).

Figure 2D:
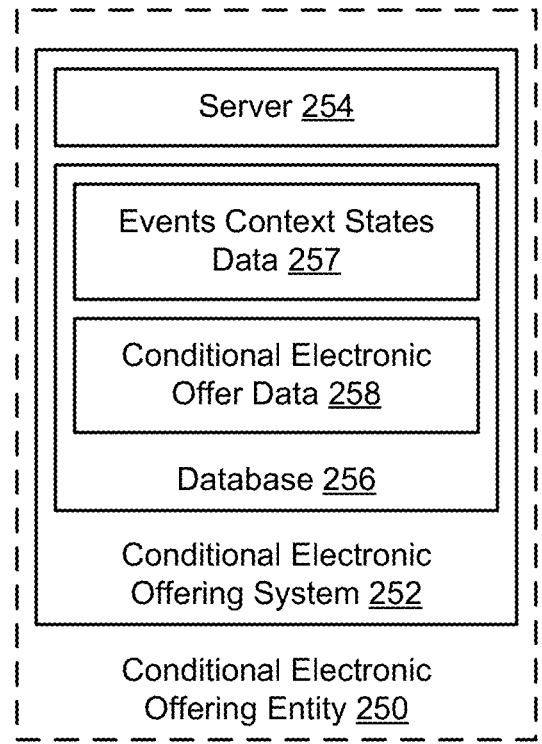

Referring to FIGS. 1 and 2D, in some aspects, computing environment 100 may include one or more conditional electronic offer servers (e.g., server 152), which may be associated with one or more conditional electronic offering entities (e.g., entity 250 (FIG. 2D)), such as merchant entities.

In certain aspects, conditional electronic offer system 252 of environment 100 may be configured to process, store, receive, obtain, and transmit information over communications network 120 for use in processes consistent with the disclosed embodiments. In certain aspects, such systems may be configured to execute software instructions to perform one or more processes consistent with the disclosed embodiments. In some aspects, conditional electronic offer system 252 may be associated with one or more conditional electronic offering entities (e.g., entity 250). In some embodiments, conditional electronic offer system 252 may include any entity storing, using, managing, or processing information related to providing dynamic, context-based electronic offer communications for a user or other entity (e.g., any of the entities described in connection with electronic offer processing entity 240, context-based event detection entity 230, conditional electronic offering entity 250, financial data entity 260, token service provider entity 270, a separate business entity, a human user, etc.). For example, in some aspects, a conditional electronic offering entity 250 may include a business entity providing such determination as a service. In some embodiments, conditional electronic offering entity 250 may be related to, concomitant with, or associated with context-based event detection entity 230, electronic offer processing entity 240, financial data entity 260, or token service provider entity 270, although such relationship is not required.

In some aspects, conditional electronic offer system 252 may include a computer having one or more processors selectively activated or reconfigured by a software program. Such a computer may be configured as a particular computing system based on execution of software instructions that perform one or more processes consistent with the disclosed embodiments. In certain aspects, conditional electronic offer system 252 may be incorporated as corresponding nodes in a distributed network, and/or as corresponding networked servers in a cloud-computing environment. In one embodiment, conditional electronic offer system 252 may communicate with one or more additional servers that facilitate the distribution of processes for parallel execution by the additional servers.

As noted, in certain aspects, conditional electronic offer system 252 may include one or more servers (e.g., server 254), and one or more data repositories (e.g., database 256). In some embodiments, server 254 may include software programs and one or more processors for executing the programs. Server 254 may be configured to execute software instructions to perform one or more processes consistent with the disclosed embodiments. In one embodiment, for example, a conditional electronic offer system (e.g., system 252) and/or another computing system may exchange information facilitating execution of the one or more processes consistent with the disclosed embodiments. The software instructions for server 254 may be incorporated into a single computer, a single server, or any additional or alternative computing device apparent to one of ordinary skill in the art. Server 254 may also include distributed computing devices and computing systems, and may execute software instructions on separate computing systems and servers. The one or more data repositories (e.g., database 256) may be configured to store information consistent with the disclosed embodiments. For example, database 256 may be configured to store events context states data 257, which includes a set of user context states, which, if fulfilled by the user context provided by the context-based event detection system 232, would output an electronic credit offer pending approval based on the users interest, or qualifications. Similarly, database 256 may be configured to store conditional electronic offer data 258, which includes data on electronic credit offers that conditional electronic offering entity 250 (e.g., a merchant) may be willing to offer to users on the condition that the users meet the requirements (also stored as part of the data) attached to the electronic credit offers.

Figure 2E:
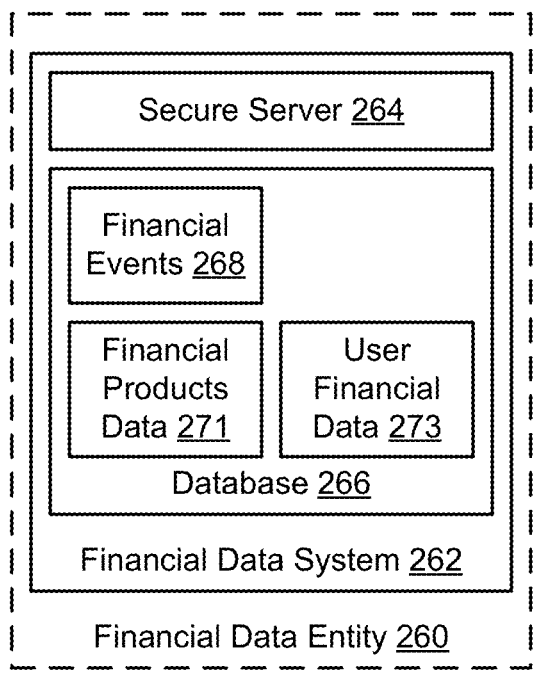

Referring to FIGS. 1 and 2E, in some aspects, computing environment 100 may include one or more financial data servers (e.g., server 162), which may be associated with one or more financial data entities (e.g., entity 260 (FIG. 2E)). Though described as financial systems and entities, such may be non-financial systems and entities or a single system and entity may provide both financial and non-financial offerings. For example, the offer may be for merchandise (including, e.g., a downloadable software application) or for a service, such as a taxi ride. Environment 100 may include both financial offering systems as shown and non-financial offering systems as not shown.

In certain aspects, financial data system 262 of environment 100 may be configured to process, store, receive, obtain, and transmit information over communications network 120 for use in processes consistent with the disclosed embodiments. In certain aspects, such systems may be configured to execute software instructions to perform one or more processes consistent with the disclosed embodiments. In some aspects, financial data system 262 may be associated with one or more financial data entities (e.g., entity 260). In some embodiments, financial data system 262 may include any entity storing, using, managing, or processing information related to providing dynamic, context-based electronic offer communications for a user or other entity (e.g., any of the entities described in connection with electronic offer processing entity 240, context-based event detection entity 230, conditional electronic offering entity 250, financial data entity 260, token service provider entity 270, a separate business entity, a human user, etc.). For example, in some aspects, a financial data entity 260 may include a business entity providing such determination as a service. In some embodiments, financial data entity 260 may be related to, concomitant with, or associated with context-based event detection entity 230, electronic offer processing entity 240, conditional electronic offering entity 250, or token service provider entity 270, although such relationship is not required.

In some aspects, financial data system 262 may include a computer having one or more processors selectively activated or reconfigured by a software program. Such a computer may be configured as a particular computing system based on execution of software instructions that perform one or more processes consistent with the disclosed embodiments. In certain aspects, financial data system 262 may be incorporated as corresponding nodes in a distributed network, and/or as corresponding networked servers in a cloud-computing environment. In one embodiment, financial data system 262 may communicate with one or more additional servers that facilitate the distribution of processes for parallel execution by the additional servers.

As noted, in certain aspects, financial data system 262 may include one or more servers (e.g., secure server 264), and one or more data repositories (e.g., database 266). In some embodiments, secure server 264 may include software programs and one or more processors for executing the programs. Secure server 264 may be configured to execute software instructions to perform one or more processes consistent with the disclosed embodiments. In one embodiment, for example, a financial data system (e.g., financial data system 262) and/or another computing system may exchange information facilitating execution of the one or more processes consistent with the disclosed embodiments. The software instructions of secure server 264 may be incorporated into a single computer, a single server, or any additional or alternative computing device apparent to one of ordinary skill in the art. Secure server 264 may also include distributed computing devices and computing systems, and may execute software instructions on separate computing systems and servers. The one or more data repositories (e.g., database 266) may be configured to store information consistent with the disclosed embodiments (e.g., financial events data 268, financial products data 271, user financial data 273, etc.).

Figure 2F:
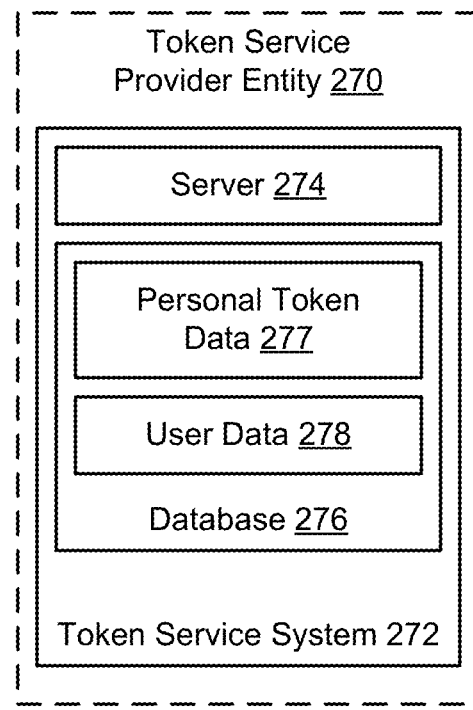

Referring to FIGS. 1 and 2F, in some aspects, computing environment 100 may include one or more token service servers (e.g., server 172), which may be associated with one or more token service provider entities (e.g., entity 270 (FIG. 2F)). Such token service provider entities may provide tokenized user identification services, consistent with the disclosed embodiments explained further below.

In certain aspects, token service system 272 of environment 100 may be configured to process, store, receive, obtain, and transmit information over communications network 120 for use in processes consistent with the disclosed embodiments. In certain aspects, such systems may be configured to execute software instructions to perform one or more processes consistent with the disclosed embodiments. In some aspects, token service system 272 may be associated with one or more token service provider entities (e.g., entity 270). In some embodiments, token service system 272 may include any entity storing, using, managing, or processing information related to providing dynamic, context-based electronic offer communications for a user or other entity (e.g., any of the entities described in connection with electronic offer processing entity 240, context-based event detection entity 230, conditional electronic offering entity 250, financial data entity 260, token service provider entity 270, a separate business entity, a human user, etc.). For example, in some aspects, a token service provider entity 270 may include a business entity providing such determination as a service. In some embodiments, token service provider entity 270 may be related to, concomitant with, or associated with context-based event detection entity 230, electronic offer processing entity 240, conditional electronic offering entity 250, or financial data entity 260, although such relationship is not required.

In some aspects, token service system 272 may include a computer having one or more processors selectively activated or reconfigured by a software program. Such a computer may be configured as a particular computing system based on execution of software instructions that perform one or more processes consistent with the disclosed embodiments. In certain aspects, token service system 272 may be incorporated as corresponding nodes in a distributed network, and/or as corresponding networked servers in a cloud-computing environment. In one embodiment, token service system 272 may communicate with one or more additional servers that facilitate the distribution of processes for parallel execution by the additional servers.

As noted, in certain aspects, token service system 272 may include one or more servers (e.g., server 274), and one or more data repositories (e.g., database 276). In some embodiments, server 274 may include software programs and one or more processors for executing the programs. Server 274 may be configured to execute software instructions to perform one or more processes consistent with the disclosed embodiments. In one embodiment, for example, a token service system (e.g., system 272) and/or another computing system may exchange information facilitating execution of the one or more processes consistent with the disclosed embodiments. The software instructions of server 274 may be incorporated into a single computer, a single server, or any additional or alternative computing device apparent to one of ordinary skill in the art. Server 274 may also include distributed computing devices and computing systems, and may execute software instructions on separate computing systems and servers. The one or more data repositories (e.g., database 276) may be configured to store information consistent with the disclosed embodiments (e.g., personal token data 277, user data 278, etc.). For example, personal token data 277 may include data on tokenized identifiers associated with a user, a user ID, an account number of a user, etc. User data 278 may include any type of data related to a user, such as personal information like name, address, contact information, demographic information, etc.

In some embodiments, environment 100 may include communications network 120. In some aspects, communications network 120 may represent any type of network or medium of digital communication for transmitting information between computing devices. For example, communications network 120 may include a LAN, a wireless LAN, a cellular network, a GSM network, a satellite network, an RF network, a Near Field Communication (NFC) network (e.g., a Wi-Fi network), a Bluetooth® connected network, a wireless Metropolitan Area Network (MAN) connecting multiple wireless LANs, NFC link(s), any physical wired connection (e.g., via an I/O port), and a WAN (e.g., the Internet). In some embodiments, communications network 120 may be secured through physical encryption (e.g., line encryption), by requiring information to be encrypted on other computer systems (e.g., end encryption), and the like.

In certain aspects, communications network 120 may include any accessible network or networks interconnected via one or more communication protocols, including hypertext transfer protocol (HTTP) and transmission control protocol/internet protocol (TCP/IP). Communications protocols consistent with the disclosed embodiments also include protocols facilitating data transfer using radio frequency identification (RFID) communications and/or NFC. In some aspects, communications network 120 may also include one or more mobile device networks, such as a GSM network or a PCS network, allowing devices (e.g., mobile device 102, a triggering device, etc.) to send and receive data via applicable communications protocols, including those described herein. In some aspects, communications network 120 may also include one or more nodes 125, which may perform any of the functions disclosed herein as being performed by any other entity or system. For example, node 125 may be a server computer, a client, a database management system, a gateway, a router, etc.

Figure 3:
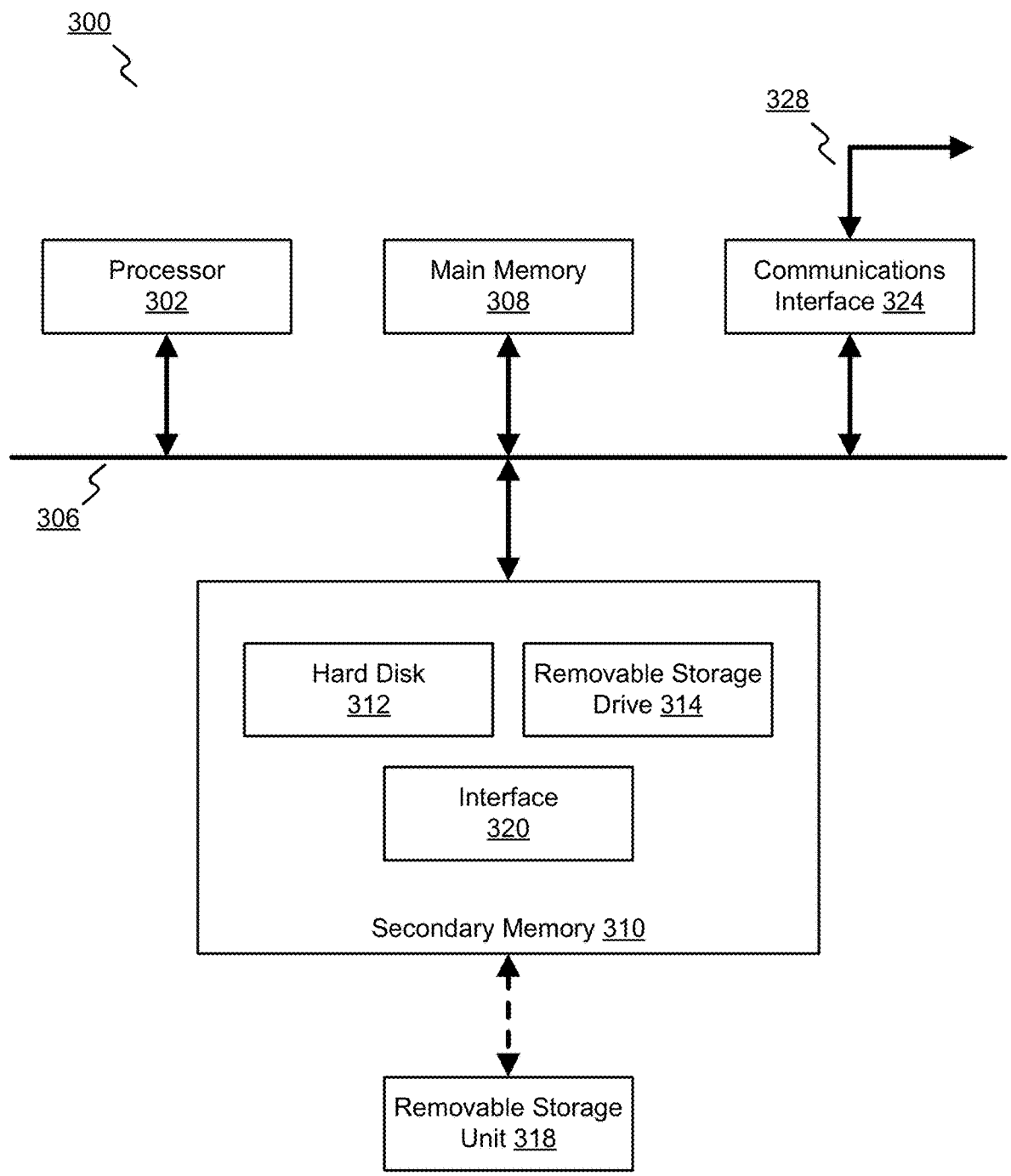
FIG. 3 depicts an exemplary computing system consistent with the disclosed embodiments.

FIG. 3 depicts an exemplary computer system 300, with which certain aspects consistent with the disclosed embodiments may be implemented. For example, in some aspects, computer system 300 may reflect computer systems associated with a client device (e.g., mobile device 102), systems 132, 142, 152, 162, 172, and the like. In some embodiments, computer system 300 may include one or more processors 302 connected to a communications backbone 306 such as a bus or external communications network (e.g., any medium of digital data communication such as a LAN, MAN, WAN, cellular network, Wi-Fi network, NFC link, Bluetooth, GSM network, PCS network, communications network 120, and any associated protocols such as HTTP, TCP/IP, RFID, etc.).

In certain aspects, computer system 300 may include main memory 308. Main memory 308 may comprise random access memory (RAM) representing a tangible and non-transitory computer-readable medium storing software programs, sets of instructions, code, or data executed with processor 302. When executed by processor 302, such instructions, software programs, etc., enable processor 302 to perform one or more processes or functions consistent with the disclosed embodiments. In some aspects, such instructions may include machine code (e.g., from a compiler) and/or files containing code that processor 302 may execute with an interpreter.

In some aspects, main memory 308 may also include or connect to a secondary memory 310. Secondary memory 310 may include a disk drive 312 (e.g., HDD, SSD), and/or a removable storage drive 314, such as a magnetic tape drive, flash memory, an optical disk drive, CD/DVD drive, or the like. The removable storage drive 314 may read from and/or write to a removable storage unit 318 in a manner known to the skilled artisan. Removable storage unit 318 may represent a magnetic tape, optical disk, or other storage medium that is read by and written to by removable storage drive 314. Removable storage unit 318 may represent a tangible and non-transitory computer-readable medium having stored therein software programs, sets of instructions, code, or data to be executed by processor 302.

In other embodiments, secondary memory 310 may include other means for allowing software programs or other program instructions to be loaded into computer system 300. Such means may include, for example, another removable storage unit 318 or an interface 320. An example of such means may include a removable memory chip (e.g., EPROM, RAM, ROM, DRAM, EEPROM, flash memory devices, or other volatile or nonvolatile memory devices) and associated socket, or other removable storage units 318 and interfaces 320, which allow instructions and data to be transferred from the removable storage unit 318 to computer system 300.

Computer system 300 may also include one or more communications interfaces 324. Communications interface 324 may allow software and data to be transferred between computer system 300 and external systems (e.g., in addition to communications backbone 306). Communications interface 324 may include a modem, a network interface (e.g., an Ethernet card), a communications port, a PCMCIA slot and card, etc. Communications interface 324 may transfer software and data in the form of signals, which may be electronic, electromagnetic, optical or other signals capable of being received by communications interface 324. These signals may be provided to communications interface 324 via a communications path (i.e., channel 328). Channel 328 carries signals and may be implemented using wire, cable, fiber optics, RF link, and/or other communications channels. In one embodiment, the signals comprise data packets sent to processor 302. Information representing processed packets may also be sent in the form of signals from processor 302 through channel 328.

In certain aspects, the computer-implemented methods described herein can be implemented on a single processor of a computer system, such as processor 302 of computer system 300. In other embodiments, these computer-implemented methods may be implemented using one or more processors within a single computer system and/or on one or more processors within separate computer systems in communication over a network.

In certain embodiments in connection with FIG. 3, the terms "storage device" and "storage medium" may refer to particular devices including, but not limited to, main memory 308, secondary memory 310, a hard disk installed in disk drive 312, and removable storage unit 318. Further, the term "computer-readable medium" may refer to devices including, but not limited to, a hard disk installed in disk drive 312, any combination of main memory 308 and secondary memory 310, and removable storage unit 318, which may respectively provide software programs and/or sets of instructions to processor 302 of computer system 300. Such software programs and sets of instructions can be stored within one or more computer-readable media. In certain aspects, software programs and sets of instructions may also be received via communications interface 324 and stored on the one or more computer-readable media.

Not shown in FIG. 3 are input/output (I/O) interfaces or I/O devices, which may be coupled to computer system 300. I/O devices may include keyboards, microphones, speakers, pointing devices, display screens, with our without touch input capabilities, biometric and other sensors to monitor user functions, position sensors (e.g., for general location, such as a GPS, and/or for relative position/orientation of the device locally such as using accelerometers and/or gyroscopes), etc.

The disclosed embodiments include systems, methods, and computer-readable mediums for storing instructions that, when executed by a processor(s), perform operations for providing customized electronic offer communications to mobile device users based on contextual information regarding the mobile devices. In particular, the processor(s) may perform operations for providing dynamically changing, context-based event triggered product and/or service offerings based on monitored sensor data obtained from network devices. The offerings may be triggered on the detection of specific contexts related to the user's mobile device, e.g., using positional or location information of the mobile device. Additionally or alternatively, the mobile device may interact with a point-of-sale terminal, which may be triggered to send contextual data, rather than the mobile device.

In some aspects, the electronic offer communication process may be employed to provide customized, dynamically determined offers (e.g., for a line of credit, rewards card, points redemption, etc.) to a user 110 based on the user's context, as determine from the user's mobile device 102, and to provide such dynamically determined offers in a relevant manner to the user 110 via the user's mobile device 102. For example, upon being detected at an airport, a user may be targeted with a card having low currency conversion rates. However, the user's context can extend beyond merely the user's location. For instance, in the example above, there may be two cards with lower currency conversion that can be offered to the user, one having a higher limit than the other, but differing in the amount of user information required for the approval. For example, in some situations, a lower-limit card (e.g., having a limit of $500) may require only a credit check, while a higher-limit card may require a credit check as well as proof of employment. To determine which card to offer the user, the system may analyze the user's financial or other (e.g., online) information. In addition, the system may populate the users credentials in a credit application form automatically, e.g., if they are a customer of the merchant's bank or the necessary information is otherwise available to the system.

A brief overview of an exemplary electronic offer communication process may be stated as follows. A context-based event detection system 232 may acquire data about a user to hand-off to an offer processing system (e.g., electronic offer engine 142, electronic offer processing system 242). The offer processing system may analyze this data along with data from a merchant (e.g., conditional electronic offering entity 250) regarding a merchant event (a set of user context states 257, which, if fulfilled by the user context provided by the context-based event detection system 232, would output an electronic credit offer pending approval based on the users interest, or qualifications). Once the potential electronic credit product offers are provided to the electronic offer processing system, the electronic offer processing system 232 may then attempt and fill some of the requirements of the user by requesting the mobile users ID in a tokenized form from the context-based event detection system 232.

Once the context-based event detection system 232 retrieves the tokenized ID from the customers mobile device 102, the token may be then sent to a bank server (e.g., financial data system 262) to get secure information about the user 110 to determine if the user's profile makes them eligible for any of the potential credit products the merchant (e.g., conditional electronic offering entity 250) is currently offering. Alternatively, the context-based event detection system 232 or electronic offer processing system 242 may send the information to application 204 and/or secure server 264 via encrypted messages, without the aid of tokens. Any form of encryption may be utilized. If they are eligible, the context-based event detection system 232 makes the electronic offer communication to the user 110. In some cases, the approval process may require further input from the user 110, in which case the electronic offer processing system may request the information from the user 110, and re-evaluate the eligibility of the user 110 for the credit product based on an updated user profile.

Figure 4:
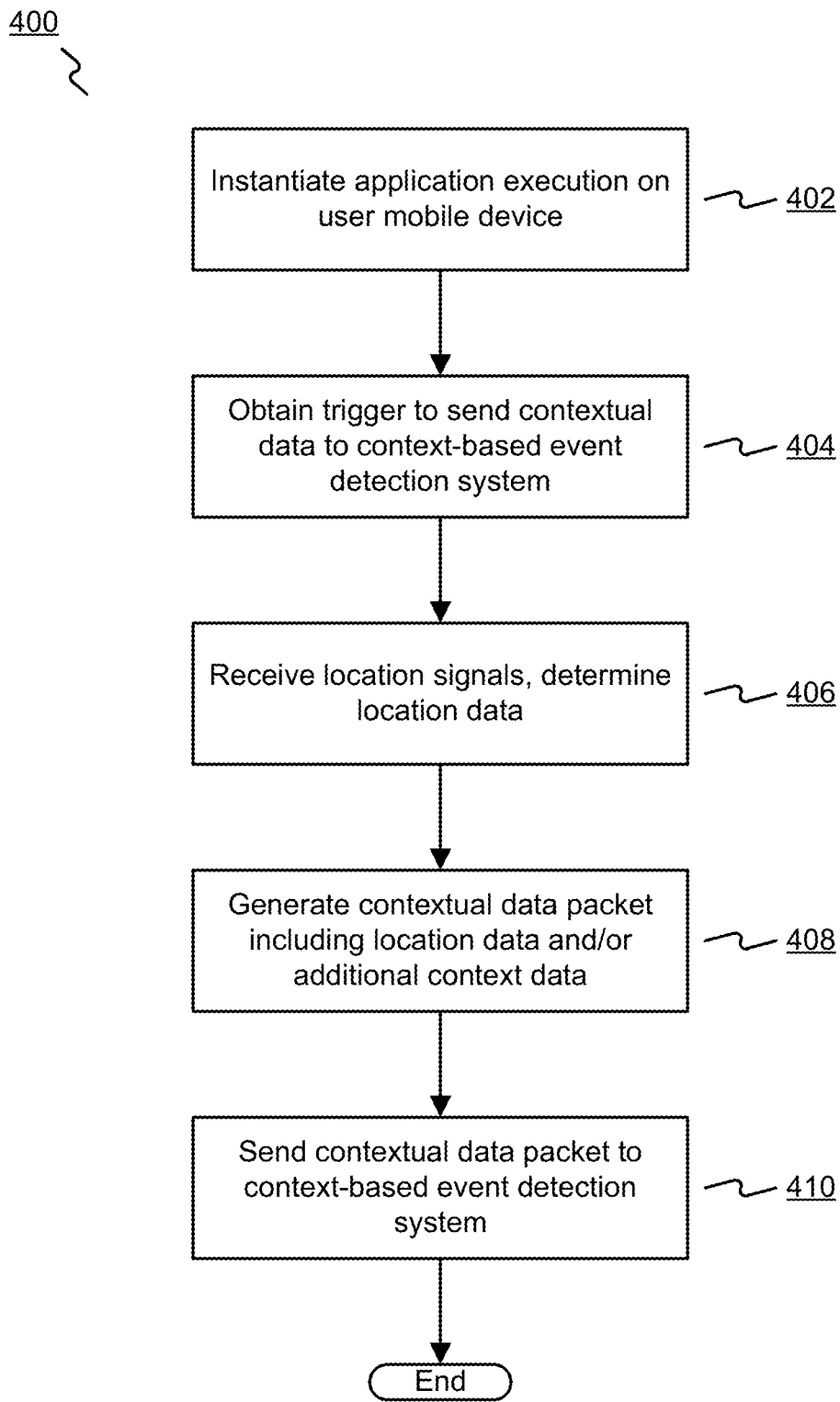
FIG. 4 depicts a flowchart for an exemplary mobile device context sensing process consistent with the disclosed embodiments.

FIG. 4 depicts a flowchart for an exemplary mobile device context sensing method 400 consistent with the disclosed embodiments. In some aspects, at step 402, mobile device 102 is configured to instantiate an application executing on the mobile device. The application may include functionality to perform the steps of method 400. At step 404, mobile device 102 may obtain a trigger to send contextual data to a context-based event detection system. For example, the mobile device 102 may send contextual data to a context-based event detection system 132 at regular or predetermined intervals, in response to requests received from system 132, or otherwise (e.g., when contextual data collected exceeds a certain threshold, or is of a specific type, or meets other requirements, as determined by the device). In some embodiments, a threshold may also be applied to determine when to send such a communication. As an example, context-based event detection system 132 may request mobile device 102 to send contextual data when the number of mobile devices in the vicinity of mobile device 102 (e.g., within a particular distance) providing location data to context-based event detection system 132 exceeds a threshold value. As another example, mobile device 102 may send contextual data to context-based event detection system 132 when it collects data exceeding a threshold amount of data (e.g., after every 1, 3, 5, or 10 determinations by mobile device 102 of its location or other contextual data).

As another alternative, the contextual data may be provided by a node 125 within network 120, other than mobile device 102. For example, the contextual data may be provided by a point-of-sale terminal 126 that may interact with mobile device, e.g., during a purchase made with a virtual wallet application. In this case, the point-of-sale terminal 126 or a related server (such as financial data server 162 or system 262) may send contextual data regarding its interaction with the mobile device to context-based event detection system 132. For example, the point-of-sale terminal 126 may send information identifying the item(s) or service(s) purchased, the time and place of purchase, the purchase price, etc.

At step 406, the mobile device 102 may receive location signals, and determine location data. Mobile devices consistent with the disclosed embodiments may include a location device or sensor (e.g., global positioning system (GPS) unit, an RFID unit, etc.) capable of obtaining location data indicative of a current geographic position of the corresponding client and/or scenario data collection device. In some embodiments, location data may be determined from other sources, such as the mobile device's interaction with a point-of-sale terminal, a LAN, a wireless LAN, a cellular network, a GSM network, a satellite network, an RF network, a Near Field Communication (NFC) network (e.g., a Wi-Fi network), a Bluetooth® connected network, a wireless Metropolitan Area Network (MAN) connecting multiple wireless LANs, NFC communication link(s), any physical wired connection (e.g., via an I/O port), and a WAN (e.g., the Internet). For example, an IP address (of the mobile device, or of a device to which the mobile device is communicatively coupled by one of the above methods) may be used to determine a location for the mobile device.

At step 408, the mobile device 102 may generate a contextual data packet including the location data and/or additional context data. For example, the additional context data may include application or device settings data, and/or user data such as a users contact data, calendar data, messaging or other communication-related data, time, date, location, etc. Additionally or alternatively, the contextual data may include information regarding recent purchases associated with the mobile device or its user 110, obtained (for example) from point-of-sale terminal 126. At step 410, the mobile device 102 may send the generated contextual data packet to the context-based event detection system 132.

Figure 5:
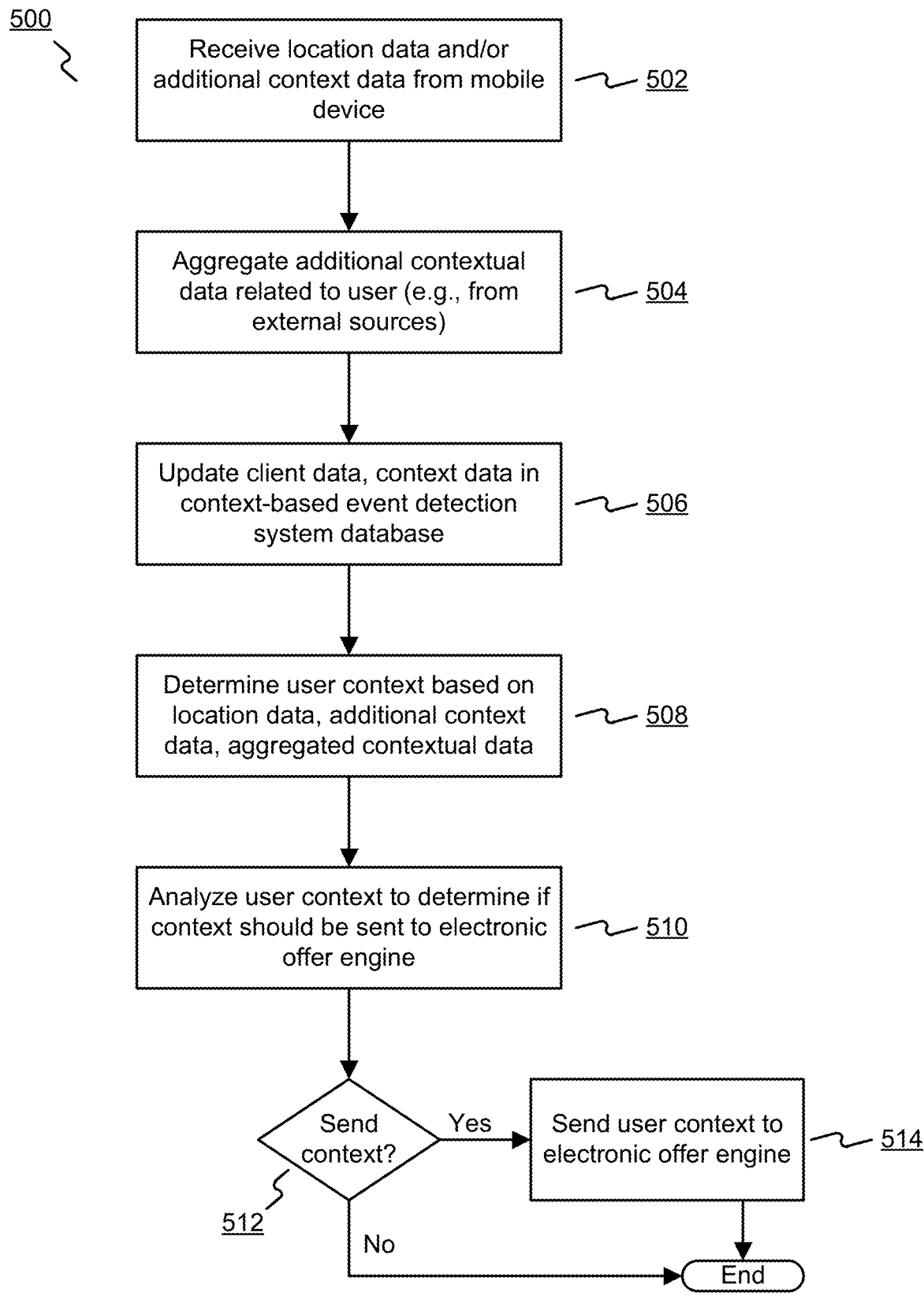
FIG. 5 depicts a flowchart for an exemplary context-based event detection process consistent with the disclosed embodiments.

FIG. 5 depicts a flowchart for an exemplary context-based event detection method 500 consistent with the disclosed embodiments. At step 502, the context-based event detection system 132 may receive the contextual data packet sent by the mobile device 102. As noted above, the contextual data packet may include location data and/or additional contextual data from the mobile device 102.

At step 504, the context-based event detection system 132 may aggregate additional contextual data related to the user (e.g., from external sources). For example, the context-based event detection system 132 may identify additional mobile devices that are within close proximity to the mobile device 102 based on the location data, and aggregate contextual data from those mobile devices. Proximity may be determined by location data for the other mobile devices, or by the fact that the other mobile devices are connected to a same resource (e.g., network gateway, router, etc.) as mobile device 102. In some aspects, the context-based event detection system 132 may obtain additional contextual data from mobile devices of users known to have a prior relationship with a user 110 of mobile device 102. Further, the context-based event detection system 132 may obtain information about the user from financial data entities (e.g., 160), such as purchase history, travel history, offers or rewards redemption history, etc.

At step 506, the context-based event detection system 132 may update its stored client data, and context data, based on the contextual data received from mobile device 102 and aggregated contextual data received from other sources.

At step 508, the context-based event detection system 132 may determine the user 110's context based on the location data, the additional contextual data from mobile device 102, and the additionally aggregated contextual data from the other sources.

At step 510, the context-based event detection system 132 may analyze this user context to determine whether the determined context should be sent to an electronic offer engine, such as electronic offer engine 142 or electronic offer processing system 242.

At step 512, if the context-based event detection system 132 determines that the context should be sent (e.g., based on conditional electronic offer rules 247 specifying that the nature or quantity of the context qualifies for sending to an electronic offer engine), and at step 514, the context-based event detection system 132 may send the user context to an electronic offer engine, such as electronic offer engine 142 or electronic offer processing system 242.

Figure 6A:
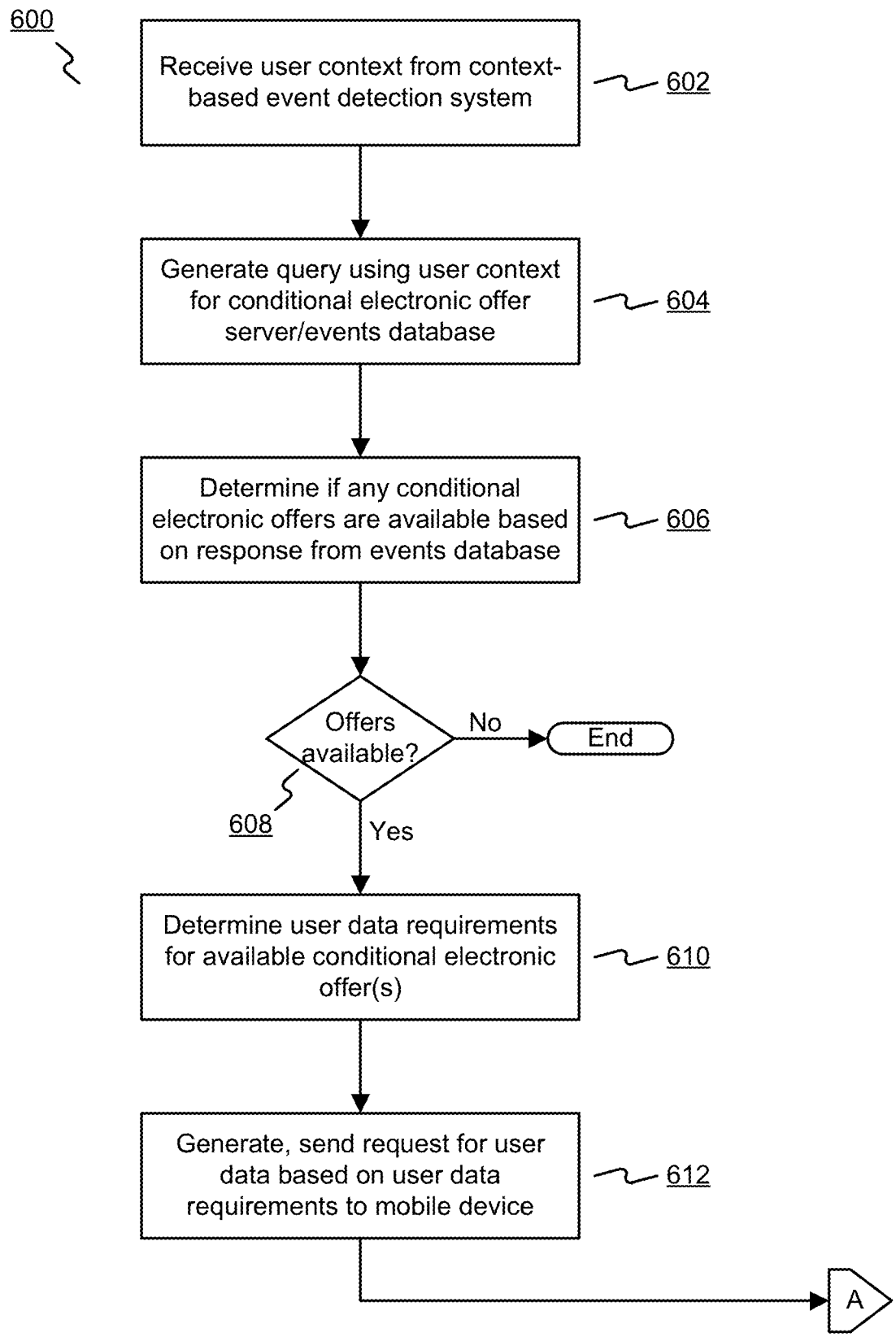
FIGS. 6A-6B depict flowcharts for an exemplary electronic offer communication process consistent with the disclosed embodiments.
Figure 6B:
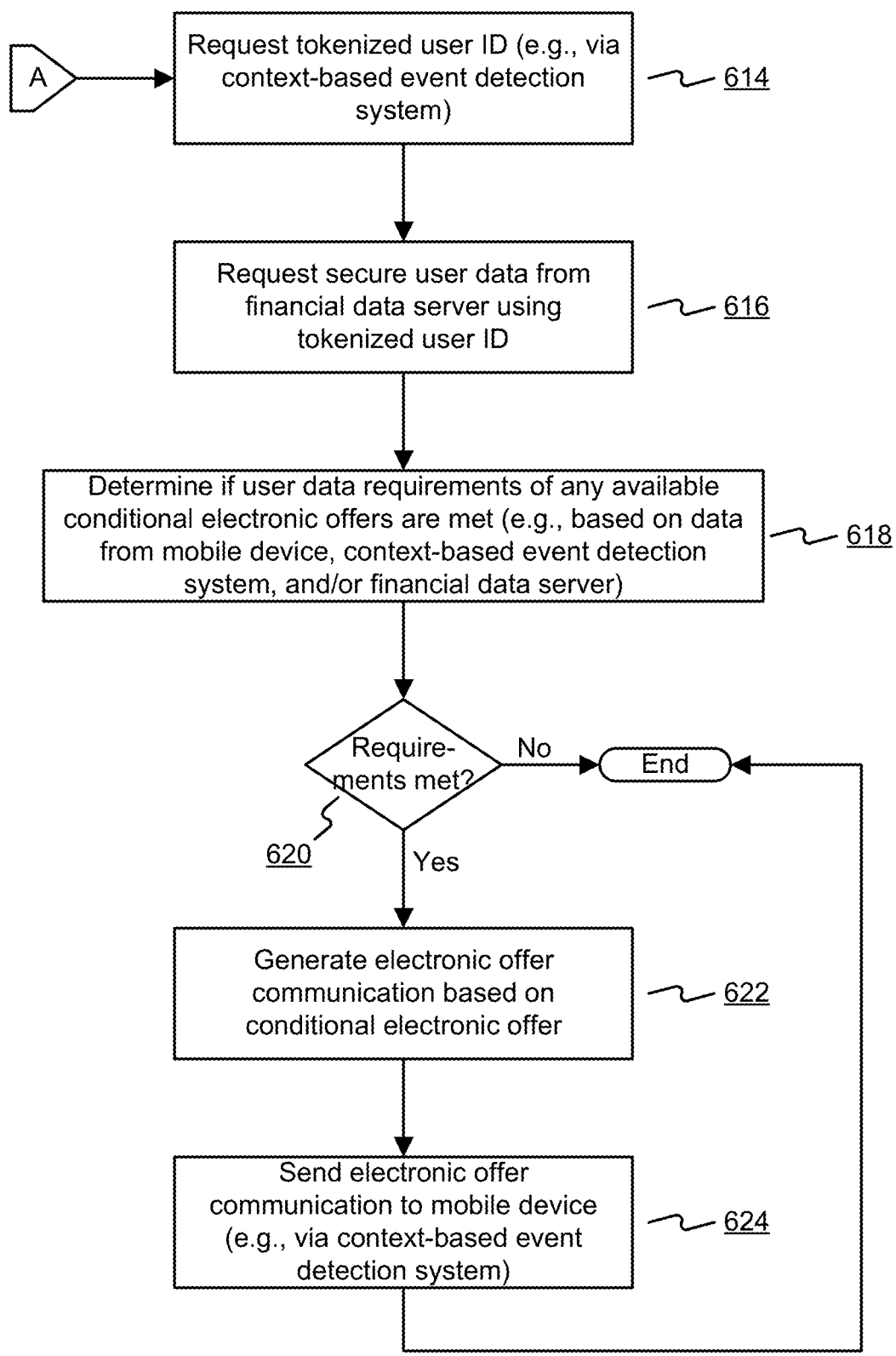

FIGS. 6A-6B depict flowcharts for an exemplary electronic offer communication process or method 600 consistent with the disclosed embodiments. With reference to FIG. 6A, at step 602, the electronic offer processing system 242 may receive the user context from the context-based event detection system 132, and at step 604, may generate a database query using the user context for available conditional electronic offers relevant to the user's context. The electronic offer processing system 242 may send the generated query to a conditional electronic offer server 254 or database 256.

At step 606, based on the response from the conditional electronic offer server 254 or database 256, the electronic offer processing system 242 may determine if any available conditional electronic offers relevant to the user's context exist. At step 608, if such conditional electronic offers are available, the electronic offer processing system 242 may, at step 610, determine user data requirements to fulfill the conditions attached to the conditional electronic offers.

At step 612, the electronic offer processing system 242 may generate and send requests for user data based on the user data requirements and the conditional electronic offers available for the user 110. The electronic offer processing system 242 may send such requests to the mobile device 102, or to other sources of such information, such as financial data server 162 or system 262.

With reference to FIG. 6B, in some instances, the user data requested may be accessible only from a secure resource, such as a secure server 264 associated with a financial data entity 260. In such instances, at step 614, the electronic offer processing system 242 may request a tokenized user ID from the mobile device 102, e.g., via the context-based event detection system 132. At step 616, the electronic offer processing system 242 may request secure user data from the secure server 264 using the tokenized user ID received from mobile device 102. Alternatively, the context-based event detection system 232 or electronic offer processing system 242 may send the information to application 204 and/or secure server 264 via encrypted messages, without the aid of tokens. Any form of encryption may be utilized.

At step 618, the electronic offer processing system 242 may determine if the user data requirements of any available conditional electronic offers are met, e.g., based on user data received from mobile device 102, context-based event detection system 132, and/or secure server 264. If the user data requirements of any available conditional electronic offers are met (step 620), at step 622, the electronic offer processing system 242 may generate an electronic offer communication based on the conditional electronic offer, and send the generated electronic offer communication to the mobile device 102.

In some aspects, the electronic offer processing system 242 may generate the electronic offer communication to the mobile device using the context-based event detection system, and by formatting the electronic offer communication based on the context of the mobile device 102 (e.g., using the mobile device 102's application or device settings). The electronic offer communication may be generated dynamically by the electronic offer processing system 242, or may be retrieved from a database or look-up table for providing to the mobile device 102.

At step 624, the electronic offer processing system 242 may send the generated electronic offer communication to the mobile device 102. In some aspects, the entire flow of method 600 may be completed substantially in real-time after determining receiving the context of the mobile device 102 from the context-based event detection system 132.

As a real-world illustration of the above-described methods, according to method 400, a user 110 may carry mobile device 102 to a baseball stadium. At step 402, mobile device 102 may instantiate an application 204 to perform the functionality of method 400.

At step 404, the user 110 may use NFC functionality on mobile device 102 to interact with the ticketing/security infrastructure at the baseball stadium. This use of the NFC functionality may trigger mobile device 102 via application 204 (or the ticketing/security infrastructure) to communicate to inform the context-based event detection system 132 that mobile device 102 is at the baseball stadium. Additionally or alternatively, the use of the NFC functionality may trigger mobile device 102 to determine its location based on GPS, which application 204 may then communicate to context-based event detection system 132. Additionally or alternatively, mobile device 102 may, as part of a regular schedule, determine its location information using GPS and communicate it via application 204 to context-based event detection system 132. Additionally or alternatively, mobile device 102 may interact with a point-of-sale terminal at the stadium, which may be triggered to send contextual data to a context-based event detection system 132 (rather than mobile device 102).

At step 406, the mobile device 102 may receive location signals, and determine location data, as described above. At step 408, upon being triggered at the baseball stadium to send contextual data to context-based event detection system 132, mobile device 102 may determine the version number and user ID associated with the application 204. It may determine the type of mobile device 102 (e.g., smartphone, tablet, personal laptop, etc.), as well as an operating system type (e.g., iOS, Android, etc.) and version number. It may further determine a default web browser (e.g., Safari, Chrome, Firefox, etc.) and version number. It may determine the identity of card service providers associated with any cards (credit, debit, rewards, etc.) stored in a virtual wallet of user 110 of mobile device 102, as well as the type of card(s) for each service provider. It may search through user 110's contact data, calendar data, messaging data, or other communication-related data, time, date, location, etc. to identify data relevant to baseball, the baseball stadium, the entry ticket, as well as any social media data, e.g., from Facebook™, Twitter™, Instagram™, etc. In some aspects, the application 204 may include settings, which may be modified by the user 110, which may include privacy and/or security settings. The user 110 may modify those settings to indicate that the user provides consent for the mobile device, via application 204, to determine, aggregate, and send such information to context-based event detection system 132. Then, mobile device 102 may generate a contextual data packet including such information, and send the contextual data packet to context-based event detection system 132.

According to method 500, at step 502, context-based event detection system 132 may receive from mobile device 102 contextual information including those discussed above.

At step 504, context-based event detection system 132 may access database 236 to retrieve any information related to user 110 or mobile device 102, from contextual data 238 or client data 239. For example, context-based event detection system 132 may query database 236 using a user ID, or a device identifier (such as an Integrated Circuit Card Identifier (ICCID)) or hardware serial number of mobile device 102. Further, context-based event detection system 132 may request location information and contextual data, similar to that obtained from mobile device 102, from other mobile devices that are related in some way to user 110 (e.g., from mobile devices of other users associated with user 110) or to mobile device 102 (e.g., from user 110's/mobile device 102's contacts/address book, social network, messages, etc.). As an example, context-based event detection system 132 may request location information and contextual data from the mobile devices that are connected to the same personal Wi-Fi hotspot at the baseball stadium as mobile device 102. Further, the context-based event detection system 132 may obtain information about user 110 from financial data entities (e.g., entity 160), such as purchase history, travel history, offers or rewards redemption history, etc., based on information related to the user's virtual wallet that may be contained in the contextual data sent by mobile device 102 via application 204.

At step 506, the context-based event detection system 132 may update its stored client data, and context data, based on the contextual data received from mobile device 102 and aggregated contextual data received from other sources. At step 508, the context-based event detection system 132 may determine the user 110's context based on the location data, the additional contextual data from mobile device 102, and the additionally aggregated contextual data from the other sources.

For example, context-based event detection system 132 may determine, based on the contextual information received from mobile device 102, that user 110 and mobile device 102 are at the baseball stadium. Further, context-based event detection system 132 may determine that user 110 and/or mobile device 102 have previously been to the same baseball stadium, based on querying prior data stored in database 236. Further, context-based event detection system 132 may determine that user 110 has previously been to the same baseball stadium based on querying public sources of information (e.g., social networks). Additionally or alternatively, context-based event detection system 132 may make such a determination based on querying the user 110's financial information (e.g., using a token-based access mechanism as discussed below) using the information obtained from mobile device 102 and previously stored data in database 236. Based on such analysis, context-based event detection system 132 may determine, with a certain confidence level, that user 110 is a fan of the baseball team resident at the baseball stadium.

At step 510, context-based event detection system 132 may determine whether any of the attributes of the context trigger sending the determined context to electronic offer processing system 242. For example, context-based event detection system 132 may determine whether user 110's status as a baseball fan, a fan of the particular baseball team, a frequent visitor to the baseball stadium, the user's methods of payment, or other attributes of the contextual data, should trigger the sending of the determined context to electronic offer processing system 242. For example, context-based event detection system 132 may look up rules identifying triggering events stored in database 236.

At step 512, context-based event detection system 132 may determine that the context should be sent (e.g., based on conditional electronic offer rules 247), and at step 514, the context-based event detection system 132 may send the user context to an electronic offer engine, such as electronic offer engine 142 or electronic offer processing system 242.

According to method 600, at step 602, electronic offer processing system 242 may query conditional electronic offer server 254 or database 256 based on keywords or search strings related to user 110's status as a baseball fan, a fan of the particular baseball team, a frequent visitor to the baseball stadium, the user's methods of payment for attending baseball events, or other attributes of the context. Here, electronic offer processing system 242 may also use artificial intelligence, machine learning, neural network, or natural language processing techniques to develop queries to conditional electronic offer server 254 or database 256.

At step 604, electronic offer processing system 242 may generate a database query using the user context for available conditional electronic offers relevant to the user's context. The electronic offer processing system 242 may send the generated query to a conditional electronic offer server 254 or database 256.

At step 606, electronic offer processing system 242 may receive from conditional electronic offer server 254 or database 256 an offer for a credit card that provides special rewards for fans of the baseball stadium, conditioned on the user meet certain creditworthiness requirements, such as savings-on-hand, credit score, credit balances, payment history, etc.

At step 608, electronic offer processing system 242 may determine that conditional electronic offers are available, and at step 610, determine user data requirements to fulfill the conditions attached to the conditional electronic offers. For example, electronic offer processing system 242 may determine as user data requirements user 110's savings-on-hand, credit score, credit balances, payment history, etc., prior to processing the available conditional electronic offer. Further, electronic offer processing system 242 may need to determine whether user 110 previously declined offers similar to the currently available offer, and may include this as another user data requirement.

At step 612, the electronic offer processing system 242 may generate and send requests for user data based on the user data requirements and the conditional electronic offers available for the user 110. The electronic offer processing system 242 may send such requests to the mobile device 102, or to other sources of such information, such as financial data server 162 or system 262.

At step 614, the electronic offer processing system 242 may request a tokenized user ID from the mobile device 102, e.g., via the context-based event detection system 132. At step 616, the electronic offer processing system 242 may request and receive secure user data from the secure server 264 using the tokenized user ID received from mobile device 102. Alternatively, the context-based event detection system 232 or electronic offer processing system 242 may send the information to application 204 and/or secure server 264 via encrypted messages, without the aid of tokens. Any form of encryption may be utilized.

At step 618, electronic offer processing system 242 may analyze such user data, including user 110's savings-on-hand, credit score, credit balances, payment history, etc., as well as determine whether user 110 previously declined offers similar to the currently available offer, based on the user data received from mobile device 102, context-based event detection system 132, and/or secure server 264. At step 620, electronic offer processing system 242 may determine that user 110's savings-on-hand, credit score, credit balances, payment history, etc. satisfy the conditions attached to the conditional electronic offer, and that user 110 did not previously decline a similar offer.

Accordingly, at step 622, electronic offer processing system 242 may generate an electronic offer communication based on the conditional electronic offer, and send the generated electronic offer communication to the mobile device 102. For example, electronic offer processing system 242 may format the electronic offer communication to mobile device 102 for user 110 based on the version number and user ID associated with the application 204, the type of mobile device 102, operating system type and version number, default web browser and version number, or other application or device settings. It may further format the electronic offer communication based on the identity of card service providers associated with any cards stored in a virtual wallet of user 110 of mobile device 102, as well as the type of card(s) for each service provider (e.g., to be consistent with colors or themes utilized by such service providers).

At step 624, the electronic offer processing system 242 may send the generated electronic offer communication to the mobile device 102. In some aspects, the entire flow of method 600 may be completed substantially in real-time after determining receiving the context of the mobile device 102 from the context-based event detection system 132.

The illustrated steps are set out to explain the exemplary embodiments shown, and it should be anticipated that ongoing technological development will change the manner in which particular functions are performed. Non-dependent steps may be performed in any order or in parallel. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A computer server, comprising:
   a memory storing instructions;
   a communications interface; and
   a hardware processor coupled to the memory and the communications interface, the hardware processor configured to execute the instructions to cause the hardware processor to:
   receive via the communications interface location data from location sensors of a plurality of mobile devices associated with a plurality of users;
   identify, based on the location data of the plurality of mobile devices, a first mobile device and one or more additional mobile devices that are in the vicinity of the first mobile device, wherein the first mobile device and the one or more additional mobile devices comprise the plurality of mobile devices;
   aggregate, via the communications interface, contextual data from the one or more additional mobile devices, wherein the contextual data comprises user data inputted into the one or more additional mobile devices by the plurality of users;
   determine one or more attributes of a context of the first mobile device based on the location data of the first mobile device and the aggregated contextual data from the one or more additional mobile devices, wherein the context indicates a relationship between electronic activities of a first user of the first mobile device and the location data of the first mobile device;
   determine whether the one or more attributes of the context of the first mobile device are triggering attributes;
   if the one or more attributes of the context of the first mobile device are triggering attributes, generate a database query using the determined context;
   send via the communications interface the generated query to an events database;
   receive via the communications interface a conditional electronic offer from the events database;
   determine user data requirements based on the conditional electronic offer;
   send via the communications interface a request based on the user data requirements to a secure server;
   receive via the communications interface user data from the secure server;
   generate an electronic offer communication based on the conditional electronic offer when the user data received from the secure server meets the user data requirements; and
   send via the communications interface the electronic offer communication to the first mobile device.

2. The computer server of claim 1, wherein the location data includes global positioning system data.

3. The computer server of claim 1, wherein the location data includes one of data related to: a Wi-Fi network connection, a cellular communications connection, a near-field communication signal, and a Bluetooth connection.

4. The computer server of claim 1, the hardware processor further configured to execute the instructions to cause the hardware processor to:
   determine that the user data requirements include a requirement for secured user data;
   send via the communications interface a request for an identification token to the first mobile device, and receive via the communications interface the identification token from the first mobile device;
   generate a request for the secured user data using the user data requirements and the identification token; and
   send via the communications interface the request for the secured user data to the secure server, and receive via the communications interface the secured user data from the secure server.

5. The computer server of claim 1, the hardware processor further configured to execute the instructions to cause the hardware processor to:
   obtain via the communications interface device or application settings data associated with the first mobile device; and
   format the electronic offer communication based on the device or application settings data associated with the first mobile device.

6. The computer server of claim 1, wherein the events database resides at a merchant server, the secure server is a bank server, and the user data requirements include user credit information.

7. A computer-implemented method, comprising:
   receiving, by at least one hardware processor, via a communications interface location data from location sensors of a plurality of mobile devices associated with a plurality of users;
   identifying, based on the location data of the plurality of mobile devices, a first mobile device and one or more additional mobile devices that are in the vicinity of the first mobile device, wherein the first mobile device and the one or more additional mobile devices comprise the plurality of mobile devices;
   aggregating, via the communications interface, contextual data from the one or more additional mobile devices, wherein the contextual data comprises user data inputted into the one or more additional mobile devices by the plurality of users;
   determining, by the at least one hardware processor, one or more attributes of a context of the first mobile device based on the location data of the first mobile device and the aggregated contextual data from the one or more additional mobile devices, wherein the context indicates a relationship between electronic activities of a first user of the first mobile device and the location data of the first mobile device;
   determining whether the one or more attributes of the context of the first mobile device are triggering attributes;
   if the one or more attributes of the context of the first mobile device are triggering attributes, generating, by the at least one hardware processor, a database query using the determined context;
   sending, by the at least one hardware processor, via the communications interface the generated query to an events database;
   receiving, by the at least one hardware processor, via the communications interface a conditional electronic offer from the events database;

determining, by the at least one hardware processor, user data requirements based on the conditional electronic offer;

sending, by the at least one hardware processor, via the communications interface a request based on the user data requirements to a secure server;

receiving, by the at least one hardware processor, via the communications interface user data from the secure server;

generating, by the at least one hardware processor, an electronic offer communication based on the conditional electronic offer when the user data received from the secure server meets the user data requirements; and sending, by the at least one hardware processor, via the communications interface the electronic offer communication to the first mobile device.

8. The method of claim 7, wherein the location data includes global positioning system data.

9. The method of claim 7, wherein the location data includes one of data related to: a Wi-Fi network connection, a cellular communications connection, a near-field communication signal, and a Bluetooth connection.

10. The method of claim 7, further comprising:
determining, by the at least one hardware processor, that the user data requirements include a requirement for secured user data;
sending, by the at least one hardware processor, via the communications interface a request for an identification token to the first mobile device, and receive via the communications interface the identification token from the first mobile device;
generating, by the at least one hardware processor, a request for the secured user data using the user data requirements and the identification token; and
sending, by the at least one hardware processor, via the communications interface the request for the secured user data to the secure server, and receiving via the communications interface the secured user data from the secure server.

11. The method of claim 7, further comprising:
obtaining, by the at least one hardware processor, via the communications interface device or application settings data associated with the first mobile device; and
formatting, by the at least one hardware processor, the electronic offer communication based on the device or application settings data associated with the first mobile device.

12. The method of claim 7, wherein the events database resides at a merchant server, the secure server is a bank server, and the user data requirements include user credit information.

13. A non-transitory computer-readable medium storing instructions which, when executed by a hardware processor, cause the hardware processor to:
receive via a communications interface location data from location sensors of a plurality of mobile devices associated with a plurality of users;
identify, based on the location data of the plurality of mobile devices, a first mobile device and one or more additional mobile devices that are in the vicinity of the first mobile device;
aggregate, via the communications interface, contextual data from the one or more additional mobile devices, wherein the contextual data comprises user data inputted into the one or more additional mobile devices by the plurality of users;
determine one or more attributes of a context of the first mobile device based on the location data of the first mobile device and the aggregated contextual data from the one or more additional mobile devices, wherein the context indicates a relationship between electronic activities of a first user of the first mobile device and the location data of the first mobile device;
determine whether the one or more attributes of the context of the first mobile device are triggering attributes;
if the one or more attributes of the context of the first mobile device are triggering attributes, generate a database query using the determined context;
send via the communications interface the generated query to an events database;
receive via the communications interface a conditional electronic offer from the events database;
determine user data requirements based on the conditional electronic offer;
send via the communications interface a request based on the user data requirements to a secure server;
receive via the communications interface user data from the secure server;
generate an electronic offer communication based on the conditional electronic offer when the user data received from the secure server meets the user data requirements; and
send via the communications interface the electronic offer communication to the first mobile device.

14. The medium of claim 13, wherein the location data includes global positioning system data.

15. The medium of claim 13, wherein the location data includes one of data related to: a Wi-Fi network connection, a cellular communications connection, a near-field communication signal, and a Bluetooth connection.

16. The medium of claim 13, further storing instructions which, when executed by the hardware processor, cause the hardware processor to:
determine that the user data requirements include a requirement for secured user data;
send via the communications interface a request for an identification token to the first mobile device, and receive via the communications interface the identification token from the first mobile device;
generate a request for the secured user data using the user data requirements and the identification token; and
send via the communications interface the request for the secured user data to the secure server, and receive via the communications interface the secured user data from the secure server.

17. The medium of claim 13, further storing instructions which, when executed by the hardware processor, cause the hardware processor to:
obtain via the communications interface device or application settings data associated with the first mobile device; and
format the electronic offer communication based on the device or application settings data associated with the first mobile device.

18. The medium of claim 13, wherein the events database resides at a merchant server, the secure server is a bank server, and the user data requirements include user credit information.

* * * * *